United States Patent [19]

Watanabe et al.

[11] Patent Number: 5,594,499
[45] Date of Patent: Jan. 14, 1997

[54] APPARATUS FOR PRODUCING A VIDEO SIGNAL IN THE COMMON INTERMEDIATE FORMAT (CIF)

[75] Inventors: Kenji Watanabe, Tokyo; Hiroyuki Yasui, Kanagawa, both of Japan

[73] Assignee: Sony Corporation, Tokyo, Japan

[21] Appl. No.: 301,469

[22] Filed: Sep. 7, 1994

[30] Foreign Application Priority Data

Sep. 14, 1993 [JP] Japan ................................. 5-229070

[51] Int. Cl.$^6$ ............................................. H04N 9/07
[52] U.S. Cl. ........................... 348/222; 348/311; 358/906
[58] Field of Search ....................... 348/222, 272, 348/294, 311, 14, 15; 358/906; H04N 7/14, 7/15, 9/04, 9/07

[56] References Cited

U.S. PATENT DOCUMENTS

| | | | |
|---|---|---|---|
| 5,198,900 | 3/1993 | Tsukagoshi | 348/415 |
| 5,247,397 | 9/1993 | Sato et al. | 360/17 |
| 5,267,022 | 11/1993 | Sakamoto et al. | 348/488 |
| 5,272,524 | 12/1993 | Nagumo et al. | 348/207 |
| 5,299,023 | 3/1994 | Nagumo et al. | 358/906 X |
| 5,339,105 | 8/1994 | Iura et al. | 348/906 |

*Primary Examiner*—Victor R. Kostak
*Assistant Examiner*—John W. Miller
*Attorney, Agent, or Firm*—Charles M. Fish, Esq.; Jerry A. Miller

[57] ABSTRACT

Analog-to-digital conversion and the CIF format conversion are performed by the video camera whose pixel number is an integral multiple or its reciprocal of that of the CIF. Therefore, it is not necessary to employ the line interpolation circuit using a large-sized memory, so that the circuit arrangement of the television conference system, the videotelephone system and so on using the codec can be simplified and the production costs thereof can be reduced. Since the video camera output is digital, even if the sampled phase fluctuates, the compression efficiency in the codec (or the coder) is prevented from being lowered and the compression efficiency can be improved.

11 Claims, 7 Drawing Sheets

APPARATUS FOR PRODUCING A VIDEO SIGNAL IN THE COMMON INTERMEDIATE FORMAT (CIF)

FIELD OF THE INVENTION

The present invention relates to an image pickup apparatus suitable for application thereof, for example, to an image transmission system such as a television conference system, a video-telephone system or the like in which a codec (a coder and a decoder or a compressor and a de-compressor) is used, or the like.

BACKGROUND

An apparatus called a codec (often referred to as a video codec) has been proposed in a television conference system, a video-telephone system or the like, for example. The codec is used in order to encode and compress picture data upon transmission or recording thereof. How to encode the picture data was standardized by the video CODEC (coder and decoder) recommendation H. 261 approved by the Comité Consultatif International des Télégraphique et Téléphonenique (CCITT) under the International Telecommunication Union (ITU) in December, 1990.

Dynamic-picture encoding is applied to broadcast communications, video conferencing, or the like, for example, in which a standard television camera may be used as a signal source and where the object is to transmit a signal to a far away place. It is also applicable when the goal is to process and store a signal locally.

In order to convert between several standard television formats such as PAL or NTSC, an intermediate video format was recommended by CCITT recommendation H. 261. This so called common intermediate format (CIF: Common Intermediate Format) can be used to account for the differences in television systems used in different regions of the world. For purposes of this document, CIF and Common Intermediate Format are intended to mean the format recommended by CCITT and similar intermediate formats which can be used for the same purpose. The differences between an NTSC system and a PAL system, for example, or the like are resolved by such intermediate formats, such that communication can be performed between CODECs. The CIF format has a picture resolution of 352 dots in the horizontal direction and 288 dots in the vertical direction, and a frame frequency which is that of 30/15/7.5 Hz.

In general, according to an encoding unit of the codec, input video data are encoded by an encoder and then multiplex-encoded. Further, after the data are temporarily stored in a transmission buffer, the data are encoded by a transmission encoder and transmitted as an encoded bit sequence. In a decoding unit thereof, the video data having the transmitted and encoded bit sequence is decoded by a transmission decoder, and the data are temporarily stored in a reception buffer and then multiplex-decoded. Further, the data are decoded to thereby obtain an original video signal.

In the case of transmitting a large quantity of picture data, video data are encoded and compressed upon transmission and subsequently decoded and decompressed upon reception. Accordingly, the codec can be used not only for transmission of the picture but also for the recording of the video data by a VTR, for example.

In case of a dynamic-picture codec, a circuit called a video pre-processor is connected to the preceding stage of an encoding unit of a portion standardized by the above-mentioned CCITT recommendation H. 261.

The video pre-processor is generally formed of a line interpolation circuit and a filter apparatus formed of a temporal filter and a motion adaptive type spatial filter. The line interpolation circuit repeats one line of video data every fifth line in order to convert video data of 240 lines (the NTSC system) into video data of 288 lines (the CIF). The temporal filter operates as a temporary cyclic type filter for improvement of compression efficiency as pre-processing upon compression of the picture. The motion adaptive type spatial filter performs the filtering so that motion in the picture becomes smoother whorl the picture is displayed on, for example, a television monitor or the like after transmission.

FIG. 4 shows an example of construction of an image pickup apparatus on the side of the coder of the above-mentioned codec, that is, on the hide for transmitting the video data.

In FIG. 4, reference numeral 2 represents a CCD (charge coupled device) of the NTSC or the PAL system for taking in a picture to be transmitted by a drive signal from a driving circuit 5. An analog video signal picked up and obtained by the CCD 2 is supplied to an analog processing circuit 3. After being subjected to various processing such as a blanking mixture, a black clip, a gain control, a pedestal adjustment, a shading correction, a gamma correction and so on, the analog video signal is supplied to an encoder (NTSC/PAL encoder) 4. After being encoded, the analog video signal is supplied to a decoder (NTSC/PAL decoder) 6 to be decoded thereby. An output of the decoder 6 is supplied to an A-D converter 7 to be converted into digital video data, which is then supplied to a CIF converting circuit 8. The CIF converting circuit 8 converts the 240 line video data, for example, into the above-mentioned video data of 288 lines by using a memory 9 and supplies video data obtained by the conversion to a eerier (a coder based on the recommendation H. 261) 10.

The coder 10 will be explained with reference to FIG. 5. FIG. 5 shows the inside construction of a video codec (picture compressing unit) mounted on a dynamic-picture codec as disclosed in Japanese patent application number 4-195615 which is hereby incorporated by reference. In FIG. 5, the coder 10 shown in FIG. 4 corresponds to an encoding controlling circuit 14, an information-source encoder 15, a video-signal multiplexing encoder 16, a transmission buffer 17 and a transmission encoder 18. A transmission decoder 21, a reception buffer 22, a video-signal multiplexing decoder 23 and an information-source decoder 24 form a decoder.

As shown in FIG. 5, in a video codec 11, video data supplied through an input terminal 13 from a signal source (transmission side or the like) not shown are subjected to encoding processing by the information-source encoder 15 on the basis of control of a controlling signal supplied from a controlling unit not shown through an input terminal 12 and the encoding controlling circuit 14. The data subjected to the encoding processing arc subjected to encoding processing by die video-signal multiplexing encoder 16. The data subjected to the encoding processing are temporarily stored in the transmission buffer 17 and then output through the transmission encoder 18 and an output terminal 19.

Encoded data supplied from a transmission side (not shown) through an input terminal 20 are subjected to decoding processing by the transmission decoder 21. The data subjected to the decoding processing arc temporarily stored in the reception buffer 21 and then subjected to decoding processing by the video-signal multiplexing decoder 23. The data subjected to the decoding processing are subjected to decoding processing by the information-source decoder 24 and then output through an output terminal 25.

FIG. 6 is a block diagram showing an example of the dynamic-picture codec using the video codec (picture compressing unit) 11 shown in FIG. 5. As shown in FIG. 6, in general, a video pre-processor 31 is usually provided at the preceding stage of the video codec 11 as the picture compressing unit 35.

The video pre-processor 31 is formed of a line interpolation circuit 32, a temporal filter 33 and a motion adaptive type spatial filter 34. Then, the line interpolation circuit 32 includes an A-D converter, a memory, a switch for switching input video data and video data read from the memory and so on and repeats one line of the video data at every fifth line to convert the video data of 240 lines (the NTSC system) into the video data of 288 lines (the CIF). That is, in FIG. 4, this unit corresponds to the CIF convening circuit 8.

That is, the input video signal supplied through an input terminal 30 from the signal source is converted into the digital video data by the A-D converter, and the digital video data are stored in the memory. Then, the digital video data from the A-D converter and the digital video data read from the memory are switched by the switch and then output, whereby the video signal formatted in accordance with the NTSC system, the PAL system or the like is converted into the video data formatted in accordance with the CIF.

Also, the temporal filter 33 includes a coefficient ROM, a field memory and an arithmetic circuit and operates as a temporary cyclic type filter for improvement of compression efficiency as pre-processing upon compression of the picture. Then, the motion adaptive type spatial filter 34 includes a block filter, a field memory, a coefficient ROM and an arithmetic circuit and performs the filtering so that motion in the picture after transmitted should become smooth when the picture is displayed on a television monitor or the like, for example.

The video data processed by the video pre-processor 31 explained above are supplied to a picture compressing unit 35 shown in FIG. 5. After being subjected to the above-mentioned processing, the video data are supplied to a multiplexing circuit 36 to be multiplexed. Then, the video data are transmitted through a line interface circuit 37 and an input and output terminal 38 to the other party.

Video data supplied through the input and output terminal 38 from the other party are supplied through the line interface circuit 37 to a separating circuit 39 and subjected to separating processing by the separating circuit 39 to then supply the same to a line thinning-out circuit 40. Then, in order to convert the video data of 288 lines (the CIF) into the video data of 240 lines (the NTSC system), the line thinning-out circuit 40 subjects the input video data to processing to remove one line of video data every sixth line. After conversion into an analog video signal by a D-A converter 41, an output of the line thinning-out circuit 40 is supplied through an output terminal 42 to a display system or the like not shown.

When the signal is convened from that of the NTSC system into that of the CIF, a 5-6 conversion in which one field is used and a 5-3 conversion in which both fields arc used are generally employed. Neither conversion is simple enough to be realized only by one line memory.

In the 5-6 conversion, one line tepee described above causes periodic distortion which drastically deteriorates picture quality and lowers compression efficiency. Even if the picture quality deterioration is permitted, a signal of 288 lines is output while a signal of 240 lines is input. Therefore, different clocks are used in the A-D converter and the codec, so that there is required a circuit for reading date at double speed, which requires additional memory.

Therefore, in general, conversion can be performed by using a field memory. In a simple conversion method, two lines are weighted and added (interpolated) to obtain one line. In a more complicated method, five lines are converted into thirty lines by oversampling to reduce the latter to six lines by a low-pass filter. In either case, a large-capacity memory is required in order to reduce deterioration of the picture quality without lowering the efficiency in the compression of the picture.

As will be clear from the above description, in a codec designed in accordance with the recommendation H. 261, there is a disadvantage that when the television signal of the NTSC system or the PAL system is convened using the CIF, a large-capacity memory is required for a line interpolation circuit of the CIF convening circuit 8 shown in FIG. 4 and the line interpolation circuit 32 of the video pre-processor 31 shown in FIG. 6. Further, its circuit arrangement and its processing process are quite complicated, so that accordingly production costs are high and it is difficult to make the apparatus small in size.

Also, when analog-to-digital conversion is performed by the A-D converter of the above-mentioned line interpolation circuit 32, small phase fluctuations of a phase to be sampled is caused as amplitude fluctuation, which increases an interframe difference in the above-mentioned coder 10. This fact will be explained with reference to FIG. 7.

In FIG. 7, reference letters $\Delta V$ represent fluctuation in amplitude caused by the fine fluctuation of the phase to be sampled and the two rows of arrows (_) represent sampled phases.

If the sampled phases fluctuate as shown by the sampled phase shown by the upper-stage arrow (_) and the sampled phase shown by the lower-stage arrow (_), then amplitude fluctuation $\Delta V$ results. This appears as the interframe difference in the coder 10.

In a codec operated in accordance with the previously mentioned CCITT recommendation H. 261, the interframe difference is detected and coded. This results in the disadvantage that increase of the interframe difference caused by the amplitude fluctuation $\Delta V$ generated from fluctuation of the sampled phases deteriorates the efficiency in the compression of the picture.

The present invention is made in view of such aspects, and an object thereof is to provide the image pickup apparatus which can simplify the circuit arrangement to thereby reduce the production costs and can suppress the increase of the interframe difference caused by the fluctuation of the sampled phases to thereby improve the efficiency in the compression of the picture.

SUMMARY OF THE INVENTION

It is an object of the invention to produce a video signal in the CIF format without introducing unnecessary circuit complexity while retaining high quality video images. This and other objects, advantages and features of the invention will become apparent to those skilled in the art upon consideration of tile following description of the invention.

An apparatus for producing a video signal in the Common Intermediate Format (CIF), according to an embodiment of the invention includes a solid-state image sensor having a predetermined number of effective pixels, where the predetermined number is an integer multiple or divisor of a number of pixels in the CIF format. The solid state image sensor produces an analog output. An analog-to-digital converter converts the analog output of the solid-state image sensor into digital data. An interface converts the digital data into CIF format video data.

Another apparatus for producing and receiving CIF format video data, according to the invention, includes a predetermined number of effective pixels, where the predetermined number is an integer multiple or divisor of a number of pixels in the CIF format. The solid state image sensor produces an analog output. An analog-to-digital converter converts the analog output of the solid-state image sensor into digital data. A digital signal processor provides a temporal filter and a motion adaptive spatial filter for filtering the digital data to produce filtered data. The filtered digital data is convened into compressed CIF format video data for transmission over a telephone link. A receiver receives CIF format data over the telephone link. A decompressor decompresses the received CIF format data. A line thinner reduces the number of lines in the CIF format data to produced thinned data. A digital to analog converter converts the thinned data to analog form.

According to the present invention, there are included a solid-state image sensor 2 having the number of effective pixels which is equal to an integral multiple (or the reciprocal of an integer multiple) of the number of pixels upon compression and transmission of picture data, an analog-to-digital convening means 50 for convening an output of the solid-state image sensor 2 into digital data, a processing means 51 for processing the digital data from the analog-to-digital converting means 50, and an interface means 52 for making a result of processing by the processing means 51 as digital data corresponding to a compression system and outputting the same.

According to the above-mentioned construction of the present invention, the output of the solid-state image sensor 2 (having the number of effective pixels, which is equal to an integer multiple (or reciprocal of an integer multiple) of the number of pixels upon compression and transmission of picture data,) is converted by the analog-to-digital converting means 50 into the digital data, the digital data from the analog-to-digital convening means 50 is processed by the processing means 51, and the interface means 52 makes the result of the processing by the processing means 51 as the digital data corresponding to the compression system and output the same.

The analog-to-digital conversion and the CIF format conversion are performed by the video camera 54 whose predetermined effective pixel number is an integer multiple (or its reciprocal) of that of the CIF. Therefore, it is not necessary to employ the line interpolation circuit using a large-sized memory, so that the circuit arrangement of the television conference system, the video-telephone system and so on using the codec can be simplified and the production costs thereof can be reduced. Since the output of the camera 54 is digitized, even if the sampled phase fluctuates the compression efficiency in the codec (or the coder) will not be lowered and thus the compression efficiency can be improved.

There are included the CCD 2 having the number of effective pixels which is equal to either an integer multiple or the reciprocal of an integer multiple of the number of pixels upon compression and transmission of the picture data, the A-D converter 50 for converting the output thereof into the digital data, the signal processing circuit 51 for processing the digital data therefrom, and the digital interface means 52 for converting the result of the processing thereby into the digital data accordant with the codec based on the recommendation H. 261 and outputting the same.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DESCRIPTION OF THE INVENTION

Figure 1:
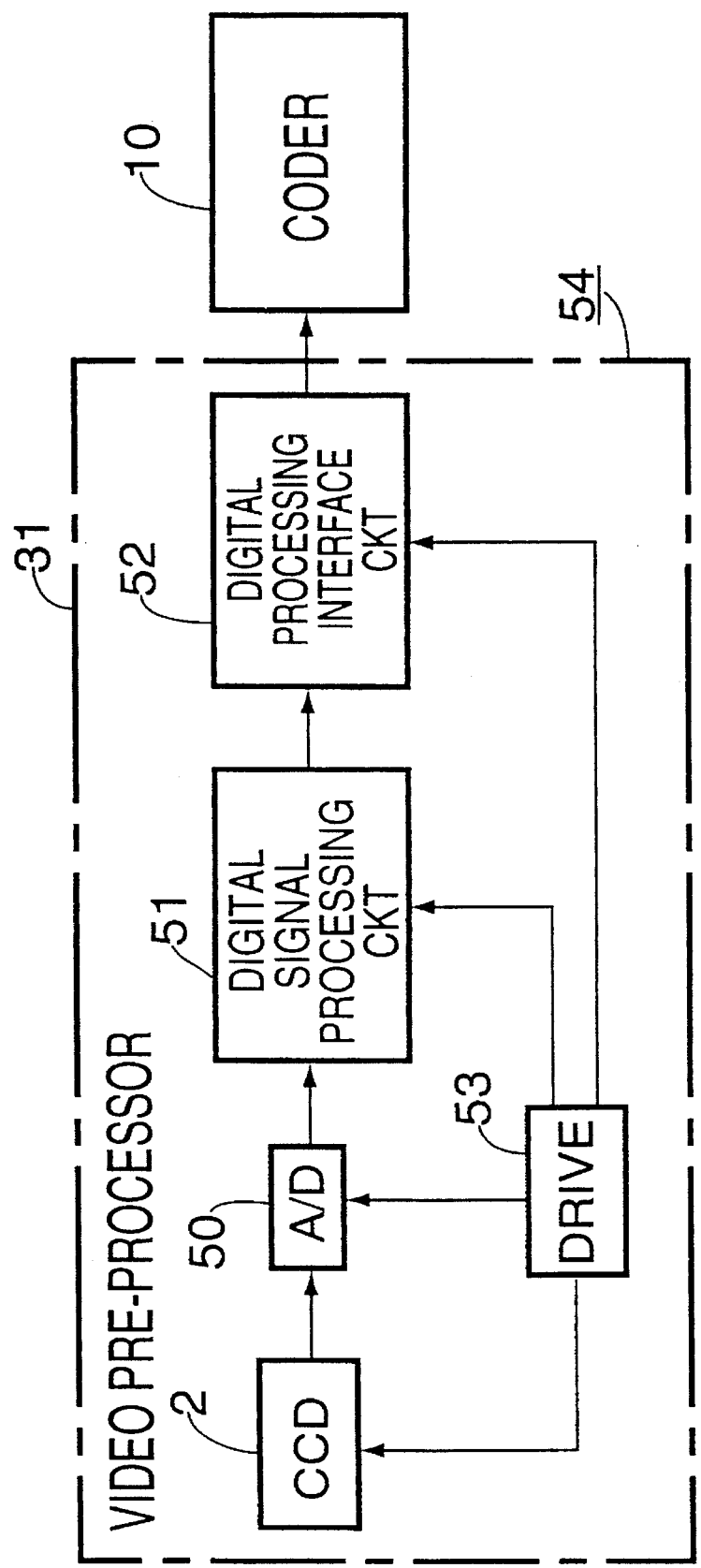
FIG. 1 is a block diagram showing one embodiment of an image pickup apparatus according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

One embodiment of the image pickup apparatus according to the present invention will hereinafter be explained in detail with reference to FIG. 1.

In FIG. 1, reference numeral 50 represents an A-D converter for onverting an image pickup signal from an image sensor such as a charge coupled device (CCD—a solid-state image sensor) 2 into digital video data. Reference numeral 51 represents a digital-signal processing circuit for subjecting the digital video data from the A-D converter 50 to processing such as a black clip, a gain control, a pedestal adjustment, a shading correction, a gamma correction and so on. Reference numeral 52 represents a digital interface circuit for outputting from an output of the digital-signal processing circuit 51 video data in accordance with a format of primary color signals R, G and B, a luminance signal Y, color difference signals R-Y and B-Y which are required by the coder 10 based on the recommendation H. 261. Reference numeral 53 represent a driving circuit for generating a clock signal and a control signal which are required by each of the above-mentioned circuits.

Here, if the CCD 2 is a three-chip system CCD (throe CCDs are provided so as to correspond to R, G and B), then the three A-D converters 50 and the three digital-signal processing circuits 51 are required. A two-chip or single-chip CCD may also be used. If a single-chip CCD is used, then a circuit arrangement can be further simplified and production costs thereof can be reduced more, so that the single-chip CCD is preferable. In the present invention, the number of effective pixels of the CCD 2 is set to the number which is an integral multiple or its multiplicative inverse of the number of pixels of the picture formatted in accordance with a CIF. It is effective to employ such specification that the number of the effective pixels is, for example, 352 (H)×288 (V) (or the number of pixels obtained by multiplying that of the CIF by an integer) and the CCD is a non-interlace CCD. Also, in case of the three-chip system CCD, there is also an optical system for supplying a light to each CCD, for example, a dichroic mirror and a lens system.

Next, operation of the image pickup apparatus shown in FIG. 1 will be explained. When a drive signal from the driving circuit 53 is supplied to the CCD 2, a photoelectrically convened output from the CCD 2 is supplied to the A-D converter 50 and then convened by the A-D converter 50 into the digital video data. The digital video data are supplied to the digital-signal processing circuit 51, subjected by the digital-signal processing circuit 51 to various kinds of digital signal processing and then supplied to the digital interface circuit 52.

The digital interface circuit 52 makes the digital video data of the NTSC system or the PAL system as the video data of the primary color signals R, G and B, the luminance signal Y and the color difference signals R-Y and B-Y which arc required in a coder 10 and converts the same into the video data in accordance with the CIF format, that is, the video data having 352 pixels in the vertical direction and 288 pixels in the horizontal direction, which are then supplied to the coder 10, and subjected by the coder 10 to a compression processing as described above.

If the number of pixels of the CCD 2 is set to 352×288 as described above, then it is unnecessary to convert the video data into the video data accordant with the CIF format in the digital interface circuit 52. In the present embodiment, since CCD 2 having the pixel number obtained by multiplying that of the CIF by an integer is used, if the number of pixels of CCD 2 is equal to that of the CIF, then the digital interface circuit 52 serves only as a line driver or a parallel-to-serial convening circuit (as a circuit for reducing signal lines). If the number of pixels of the CCD 2 is not equal to that of the CIF, then the digital interface circuit 52 becomes a simple circuit having a thinning-out circuit for thinning out 1/N lines and an interpolation circuit for interpolating lines multiplied by N or the like.

Figure 2:
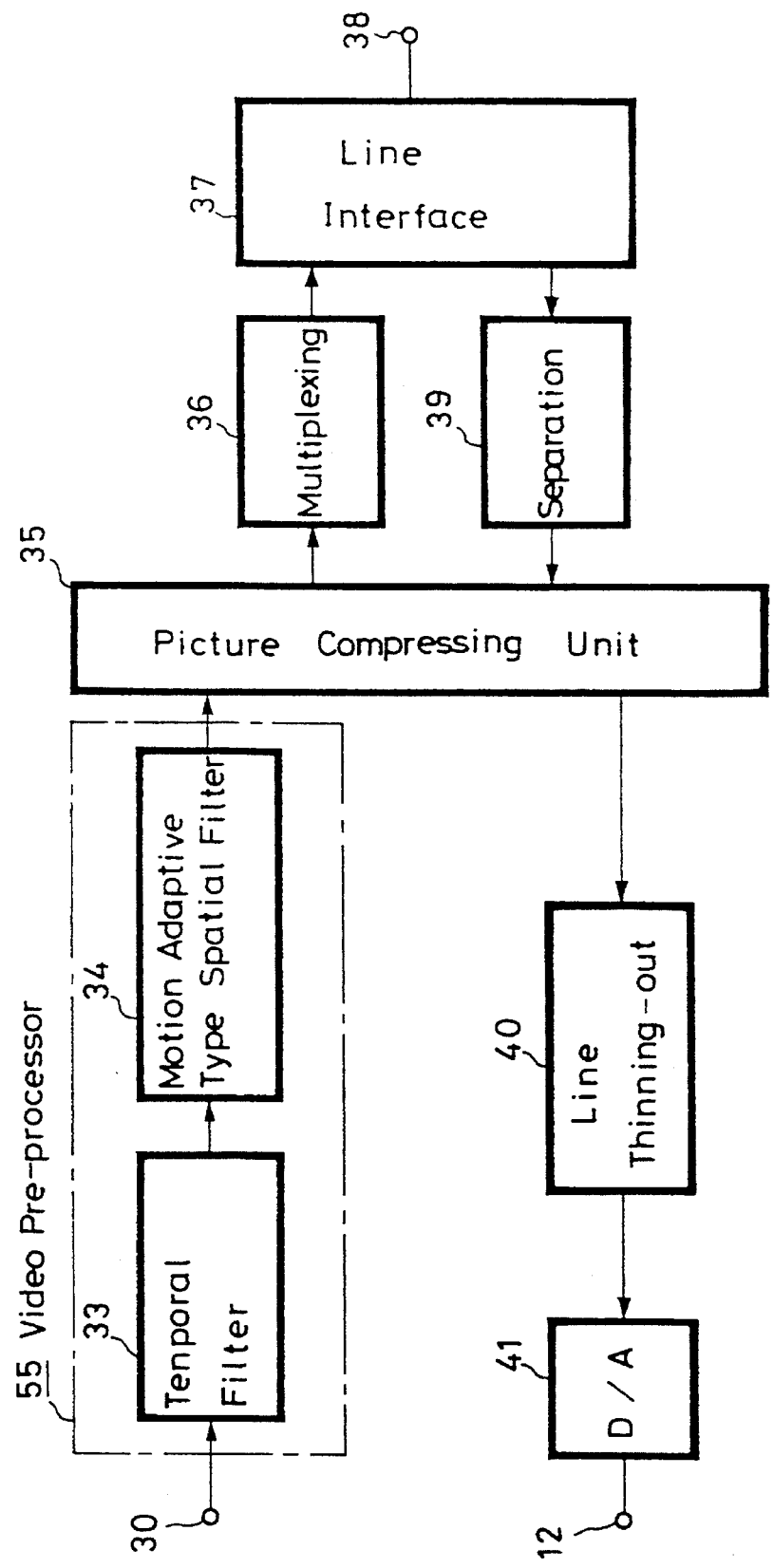
FIG. 2 is a block diagram showing an example of a dynamic-picture codec to which one embodiment of the image pickup apparatus according to the present invention is applied.
Figure 6:
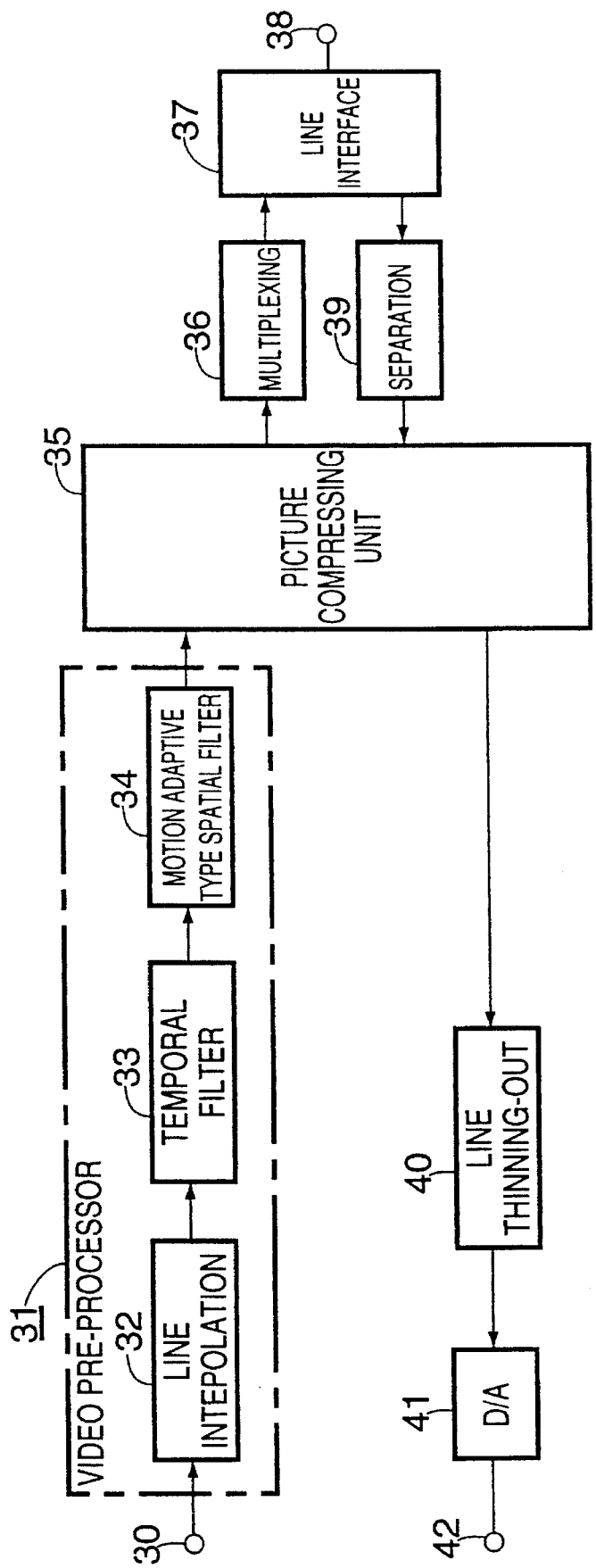
FIG. 6 is a block diagram showing an example of a dynamic-picture codec used to explain the example of the image pickup apparatus according to FIG, 4.

FIG. 2 is a block diagram showing an example in which an output of a video camera 54 shown in FIG. 1 is supplied to a dynamic-picture codec, that is, an example in which the video camera 54 shown in FIG. 1 is used in a television conference system and a video-telephone system, for example. In FIG. 2, a picture compressing unit 35 corresponds to the coder 10. Also, in FIG. 2, the same reference numerals are given to portions corresponding to those in FIG. 6, and detailed explanation thereof will be omitted.

In the figure, reference numeral 55 represents a video pre-processor. The video pre-processor 55 does not require the line interpolation circuit 32 shown in FIG. 6. The reason for this is that the output from the video camera 54 shown in FIG. 1 has already become the video data formatted in accordance with the CIF. That is, the video pre-processor 55 shown in this figure is formed of a temporal filter 33 and a motion adaptive type spatial filter 34. The motion adaptive type spatial filter 34 can be replaced with mother filter which does not cost a lot or the like.

Figure 3:
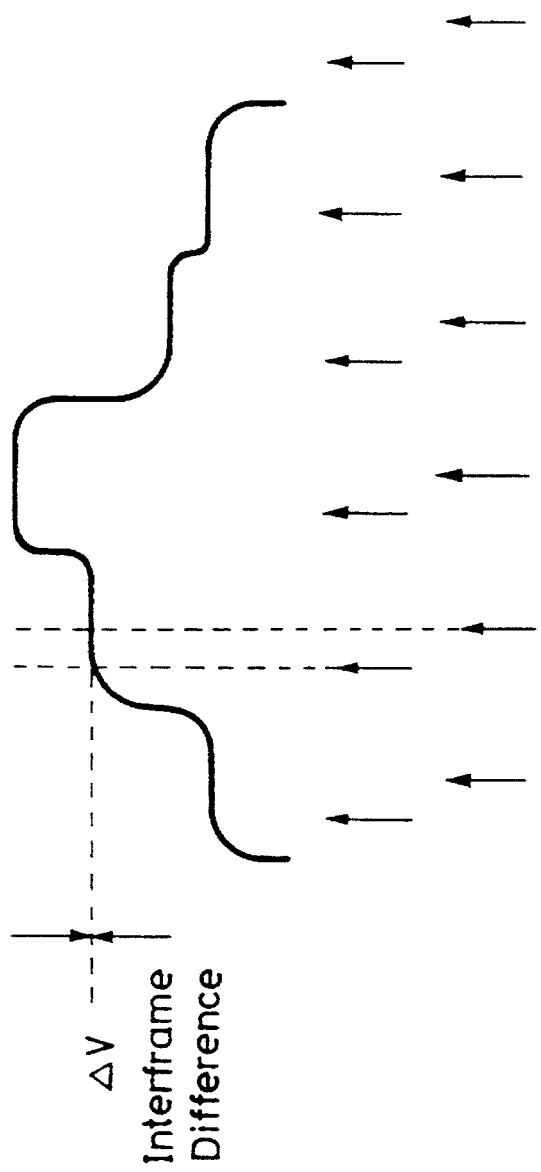
FIG. 3 is an explanatory diagram for explanation about amplitude fluctuation caused by fine fluctuation of a phase to be sampled upon analog-to-digital conversion used to explain one embodiment of the image pickup apparatus according to the present invention.

Referring to FIG. 3, generation of an interframe difference caused by fine fluctuation of sampled phases will mow be explained. In the present embodiment, as explained with reference to FIGS. 1 and 2, of line interpolation and the A-D converter are provided in the video camera 54 without providing the line interpellation circuit 32 and an A-D converter mounted on the line interpolation circuit 32 in the video pre-processor 31, function.

As shown in FIG. 3, the output of the CCD 2 is already in the form of a sampled output. When an image pickup signal obtained under being sampled is sampled by the A-D converter 50, if the fine fluctuation of the phase as shown by arrows at upper and lower stages occurs, then amplitude fluctuation ΔV caused by the fine fluctuation of the phase is prevented as is clear from the figure.

Accordingly, even if the image pickup signal sampled by the A-D converter 50 is subjected by digital-signal processing circuit 51 to the signal processing and further subjected by the digital interface circuit 52 to processing such as the line interpolation and so on and the processed output is supplied to the coder 10, that is, the video pre-processor 55, amplitude fluctuation ΔV is prevented, so that the interframe difference resulting therefrom is also prevented.

Figure 4:
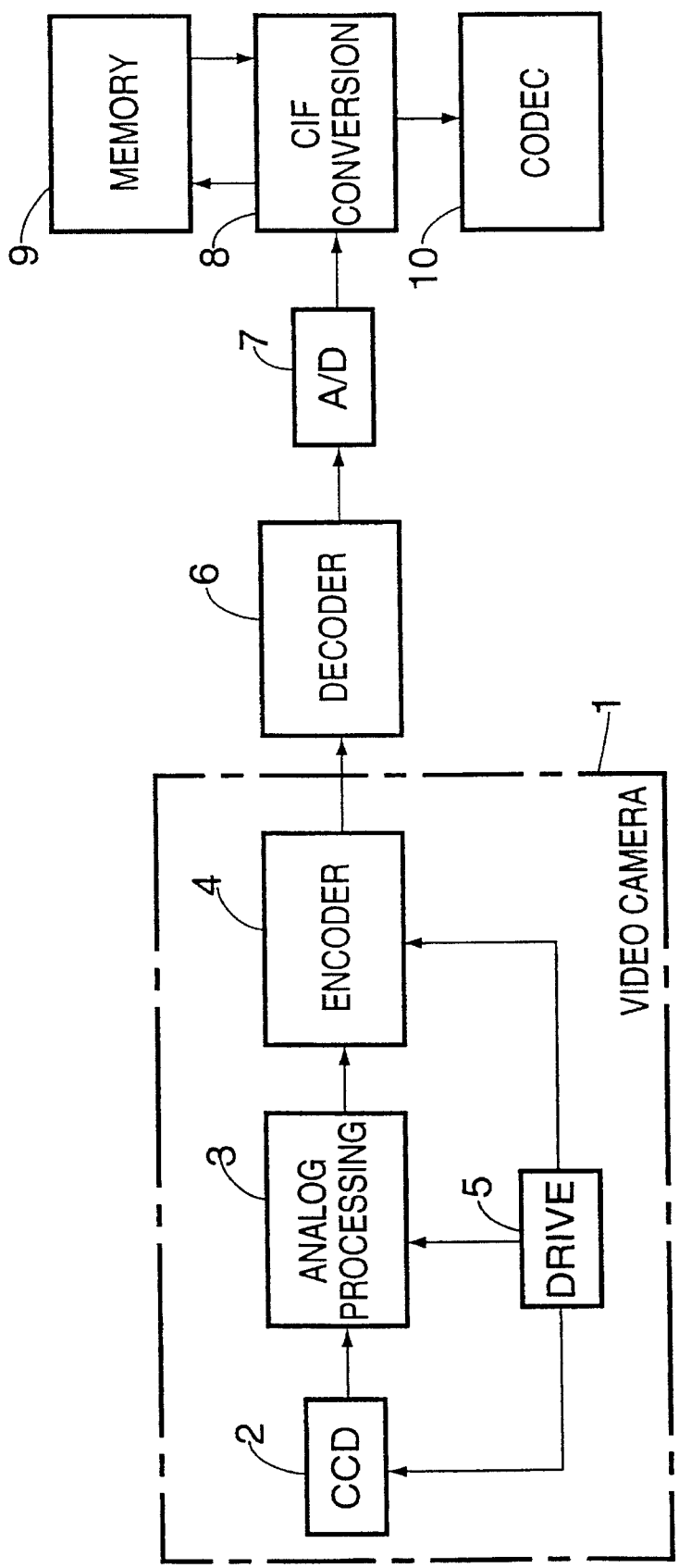
FIG. 4 is a block diagram of an example of an image pickup apparatus designed according to the CCITT recommendation.
Figure 7:
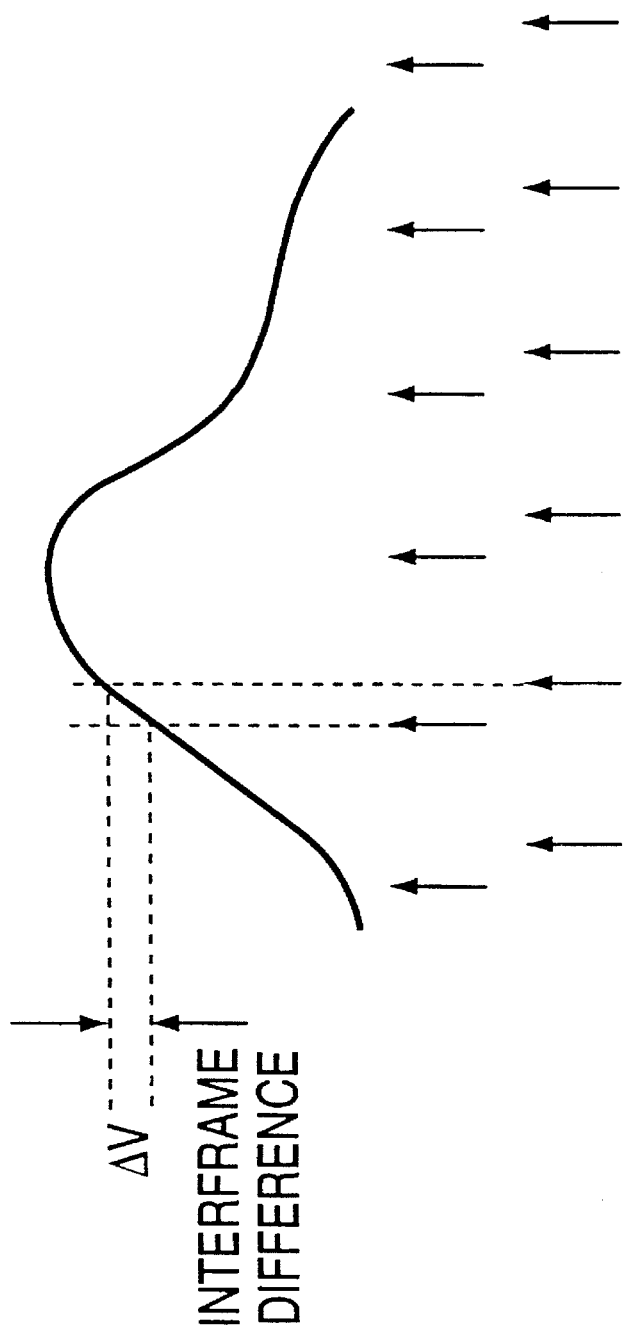
FIG. 7 is an explanatory diagram for explanation about amplitude fluctuation caused by fine fluctuation of a phase to be sampled upon analog-to-digital conversion used to explain one embodiment of the image pickup apparatus according to FIG. 4.

In the image pickup apparatus explained with reference to FIG. 4, such a signal that the sampled output of the CCD 2 is subjected to analog processing by the analog processing circuit 3, further encoded by the encoder 4 and decoded by the decoder 6, is converted into the digital video data by the A-D converter 7, so that a signal to be subjected by the A-D converter 7 to analog-to-digital conversion has an analog waveform as shown in FIG. 7. Accordingly, if the analog waveform is sampled, then the fine fluctuation of the sampled phase immediately becomes the amplitude fluctuation ΔV, which becomes not an interframe difference of an input video signal in the coder 10 (corresponding to the line interpolation circuit 32 of the video pre-processor 31 in FIG. 6) but the interframe difference in the coder 10, so that it is natural that compression efficiency is drastically lowered.

However, in the present embodiment, the sampled output of the CCD 2 as shown in FIG. 3 is converted by the A-D converter 50 into the digital video data which is subjected by the digital-signal processing circuit 51 to the digital-signal processing, converted by the digital interface circuit 52 into the digital video data accordant with the CIF format and then supplied to the coder 10, so that even if the fine fluctuation of the sampled phase upon conversion into the digital data in the A-D converter 50 is caused, then the amplitude fluctuation ΔV as shown in FIG. 3 is prevented from being generated, whereby the interframe difference caused by the amplitude fluctuate on ΔV is prevented. Accordingly, efficient compression can be performed on the side of the coder 10.

Operation of the dynamic-picture codec shown in FIG. 2 will next be explained. That is, input video data which are formatted in accordance with the CIF and supplied from a signal source through an input terminal 30 is subjected to pre-processing upon the compression of the picture, and further the output is filtered by the motion adaptive type spatial filter 34 so that motion in the picture is smooth when the picture after transmitted is displayed on a television monitor, for example, or the like.

Figure 5:
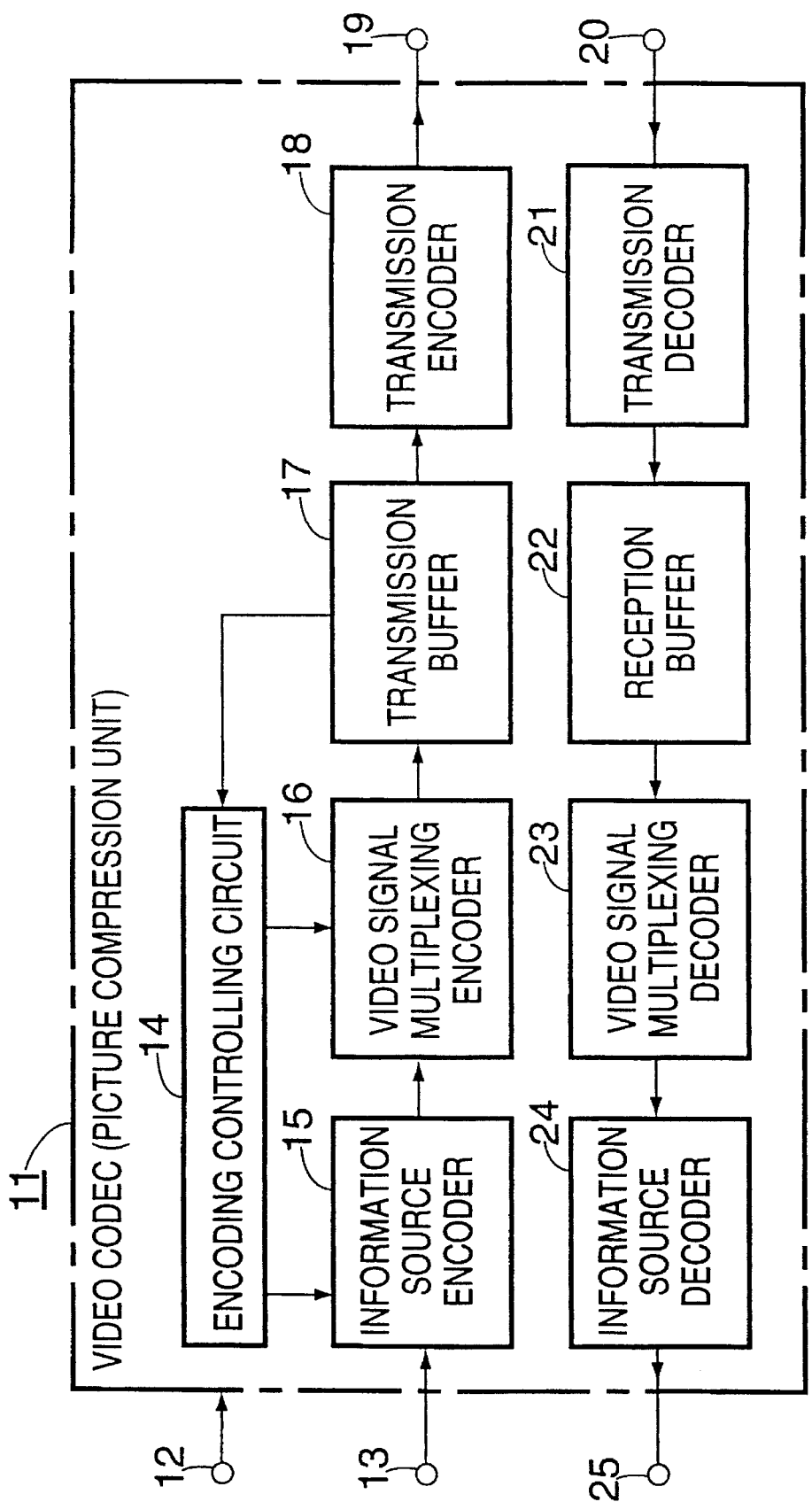
FIG. 5 is a block diagram showing an example of a video codec used to explain the example of the image pickup apparatus according to the FIG. 4.

The video data processed by the video pre-processor 55 as explained above is supplied to the picture compressing unit 35 shown in FIG. 5 and subjected thereby to the processing as described above to then be supplied to a multiplexing circuit 36 and multiplexed. Then, the video data are transmitted to the other party through a line interface circuit 37 and an input and output terminal 38.

Video data supplied through the input and output terminal 38 from the other party is supplied through the line interface circuit 37 to a separating circuit 39, subjected to separating processing by the separating circuit 39 and then supplied to a line thinning-out circuit 40. Then, in order to convert the video data of 288 lines (the CIF) into the video data of 240 lines (the NTSC system), the line thinning-out circuit 40 subjects the input video data to processing for thinning out a video data of one line amount at every sixth line. After being converted into an analog video signal in a D-A converter 41, an output of the line thinning-out circuit 40 is supplied through an output terminal 42 to a display system or the like.

As described above, in the present embodiment, there is used the CCD 2 having the number of the effective pixels which is an integral multiple or its reciprocal of the number of pixels formatted in accordance with the CIF. The sampled output of the CCD 2 is digitized by the A-D converter 50. The digitized data are subjected by the digital-signal processing circuit 51 to the signal processing. The digital video data obtained by the signal processing is converted by the digital interface circuit 52 into the video data accordant with the standard of the recommendation H. 261 and then supplied to the codec standardized by the recommendation H. 261. Since the analog-to-digital conversion and the CIF format conversion are performed by the video camera 54, even if the sampled phase fluctuates, the compression efficiency in the codec (or the coder) is not lowered and thus the compression efficiency can be improved. Furthermore, since the number of pixels is equal to an integral multiple (or its reciprocal of the number of pixels formatted in accordance with the CIF, it is not necessary to employ the line interpolation circuit using a large-sized memory. Thus, the circuit arrangement of fie television conference system, the video-telephone system and so on using the codec can be simplified and the production costs thereof can be reduced.

While in the above-mentioned embodiment, there is explained the case where there is used the CCD 2 having the number of the effective pixels which is an integral multiple or its reciprocal of the number of pixels accordant with the CIF format, the similar effect can be obtained in case of using a solid-state image sensor, a BBD (Bucket Brigade Device) or the like having the number of the effective pixels which is an integral multiple or its reciprocal number of the number of pixels accordant with the CIF format.

According to the present invention described above, the output of the solid-state image sensor having a number of effective pixels, which is equal to an integer multiple (or the reciprocal of an integer multiple of number of pixels upon compression and transmission of picture data, is converted by the analog-to-digital converting means into the digital data, the digital data from the analog-to-digital convening means is processed by the processing means, and the result of the processing by the processing means is converted by the interface means into the digital data compliant with the compression system and then output. Therefore, even if the sampled phase is fluctuated, then an influence therefrom is prevented from being given to a compression processing system, whereby the compression efficiency can be improved, the compression processing system can be made small in size, and the production costs thereof can be reduced.

Thus it is apparent that in accordance with the present invention, an apparatus that fully satisfies the objectives, aims and advantages is set forth above. While the invention has been described-in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An apparatus for producing a video signal in the Common Intermediate Format (CIF), comprising in combination:

a solid-state image sensor having a predetermined number of effective pixels, where said predetermined number is an integer multiple or divisor of a number of pixels in said CIF format, said solid state image sensor producing an analog output;

an analog-to-digital converter for converting said analog output of said solid-state image sensor into digital data;

interface means for converting said digital data into CIF format video data and for outputting said CIF format video data for transmission.

2. The apparatus of claim 1, wherein said CIF format data represents compressed video having 352 horizontal pixels and 288 vertical pixels.

3. The apparatus of claim 1, further comprising a digital signal processor connected between said analog to digital converter and said interface means, and wherein said output of said analog-to-digital converter is black clip processed by said digital signal processor prior to conversion by said interface means.

4. The apparatus of claim 1, further comprising a digital signal processor connected between said analog to digital converter and said interface means, and wherein said output of said analog-to-digital converter is processed for gain control by said digital signal processor prior to conversion by said interface means.

5. The apparatus of claim 1, further comprising a digital signal processor connected between said analog to digital converter and said interface means, and wherein said output of said analog-to-digital converter is processed for pedestal adjustment by said digital signal processor prior to conversion by said interface means.

6. The apparatus of claim 1, further comprising a digital signal processor connected between said analog to digital converter and said interface means, and wherein said output of said analog-to-digital converter is processed for shading correction by said digital signal processor prior to conversion by said interface means.

7. The apparatus of claim 1, further comprising a digital signal processor connected between said analog to digital converter and said interface means, and wherein said output of said analog-to-digital converter is processed for gamma correction by said digital signal processor prior to conversion by said interface means.

8. The apparatus of claim 1, wherein said solid state image sensor includes a charge coupled device having 352 by 288 pixels, and wherein said interface means comprises a line driver.

9. An apparatus for producing a video signal in the Common Intermediate Format (CIF), comprising in combination:

- a solid-state image sensor having at least one charge coupled device having 352 horizontal pixels and 288 vertical pixels, and wherein said CIF format requires 352 horizontal pixels and 288 vertical pixels, said solid state image sensor producing an analog output;
- an analog-to-digital converter for converting said analog output of said solid-state image sensor into digital data;
- a digital signal processor receiving said digital data from said analog to digital converter, and selectably processing said digital data by one or more techniques comprising black clipping, gain controlling, pedestal adjustment, shading correction or gamma correction, to produce a processed digital signal; and
- interface means, comprising a line driver, for converting said digital data into a serial CIF format video data stream and outputting said data stream for transmission or recording.

10. An apparatus for producing a video signal in the Common Intermediate Format (CIF), comprising in combination:

- a solid-state image sensor having at least one non-interlace charge coupled device having N*(352 horizontal pixels and 288 vertical pixels), where N is an integer or the reciprocal of an integer, and wherein said CIF format requires 325 horizontal pixels and 288 vertical pixels, said solid state image sensor producing an analog output;
- an analog-to-digital converter for converting said analog output of said solid-state image sensor into digital data;
- a digital signal processor receiving said digital data from said analog to digital converter, and selectably processing said digital data by one or more techniques comprising black clipping, gain controlling, pedestal adjustment, shading correction or gamma correction, to produce a processed digital signal; and
- interface means, comprising a line driver, for convening said digital data into a serial CIF format video data stream and outputting said data stream for transmission or recording.

11. An apparatus for producing and receiving CIF format video data, comprising in combination:

- a solid-state image sensor having a predetermined number of effective pixels, where said predetermined number is an integer multiple or divisor of a number of pixels in said CIF format, said solid state image sensor producing an analog output;
- an analog-to-digital converter for converting said analog output of said solid-state image sensor into digital data;
- digital signal processing means for providing a temporal filter and a motion adaptive spatial filter for filtering said digital data to produce filtered data;
- interface means for convening said filtered digital data into CIF format video data prior to compressing said CIF formatted data for transmission over a telephone link;
- means for receiving CIF format data over a telephone link;
- a decompressor for decompressing said received CIF format data;
- means for reducing the number of lines in said CIF format data to produce thinned data; and
- a digital to analog converter for converting said thinned data to analog form.

* * * * *